(12) United States Patent
Mine

(10) Patent No.: US 6,987,808 B2
(45) Date of Patent: Jan. 17, 2006

(54) TRANSCODING METHOD AND TRANSCODING APPARATUS

(75) Inventor: Shinichi Mine, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 606 days.

(21) Appl. No.: 10/055,841

(22) Filed: Jan. 23, 2002

(65) Prior Publication Data

US 2002/0122481 A1  Sep. 5, 2002

(30) Foreign Application Priority Data

Jan. 24, 2001  (JP) ............................. 2001-016277

(51) Int. Cl.
*H04N 7/12* (2006.01)
(52) U.S. Cl. ................................. 375/240.03
(58) Field of Classification Search .......... 375/240.03, 375/240.05, 240.2, 240.26; 348/425.1, 425.3, 348/400.1, 397.1; 382/235; 341/61
See application file for complete search history.

(56) References Cited

U.S. PATENT DOCUMENTS

| | | | | |
|---|---|---|---|---|
| 5,623,312 A | * | 4/1997 | Yan et al. | 375/240.16 |
| 6,208,688 B1 | * | 3/2001 | Seo et al. | 375/240.03 |
| 6,658,157 B1 | * | 12/2003 | Satoh et al. | 382/239 |
| 6,687,296 B1 | * | 2/2004 | Sato et al. | 375/240.12 |

OTHER PUBLICATIONS

Sorial et al, "Estimating Laplacian parameters of DCT coefficients for requantization in the transcoding of MPEG-2 video", International Conference on Image Processing, vol. 1, pp. 956-959, Sep. 2000.*
Werner, "Requantization for Transcoding of MPEG-2 Intraframes", IEEE Transactions on Image Processing, vol. 8, No. 2, pp. 179-191, Feb. 1999.*
Nakajima et al, "Rate Conversion of MPEG Coded Video by Requantization Process", IEEE, pp. 408-411, 1995.*

* cited by examiner

*Primary Examiner*—Vu Le
(74) *Attorney, Agent, or Firm*—Harness, Dickey & Pierce, P.L.C.

(57) ABSTRACT

An apparatus comprises an input coded data buffer (2) for temporarily storing first coded data, an inverse quantization portion (4) for performing inverse quantization, a quantization portion (5) for requantising the inverse-quantized data by using new quantizer scale (NEW Q-scale), a DCT DC difference detector (8) for detecting a DC-component difference value of DCT coefficients of an I-picture from the first coded data, a DC difference mapping portion (9) for extracting a noticed region, which a person easily notices, according to the difference value, an edge MBA calculator (10), and a rate controller (1) for determining a new quantizer scale (NEW Q-scale) according to a result of the extraction of the noticed region and to the position of a slice, to which the data belongs, on a screen.

13 Claims, 6 Drawing Sheets

FIG. 1
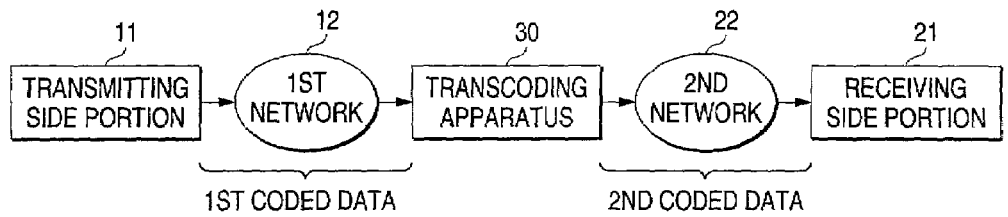
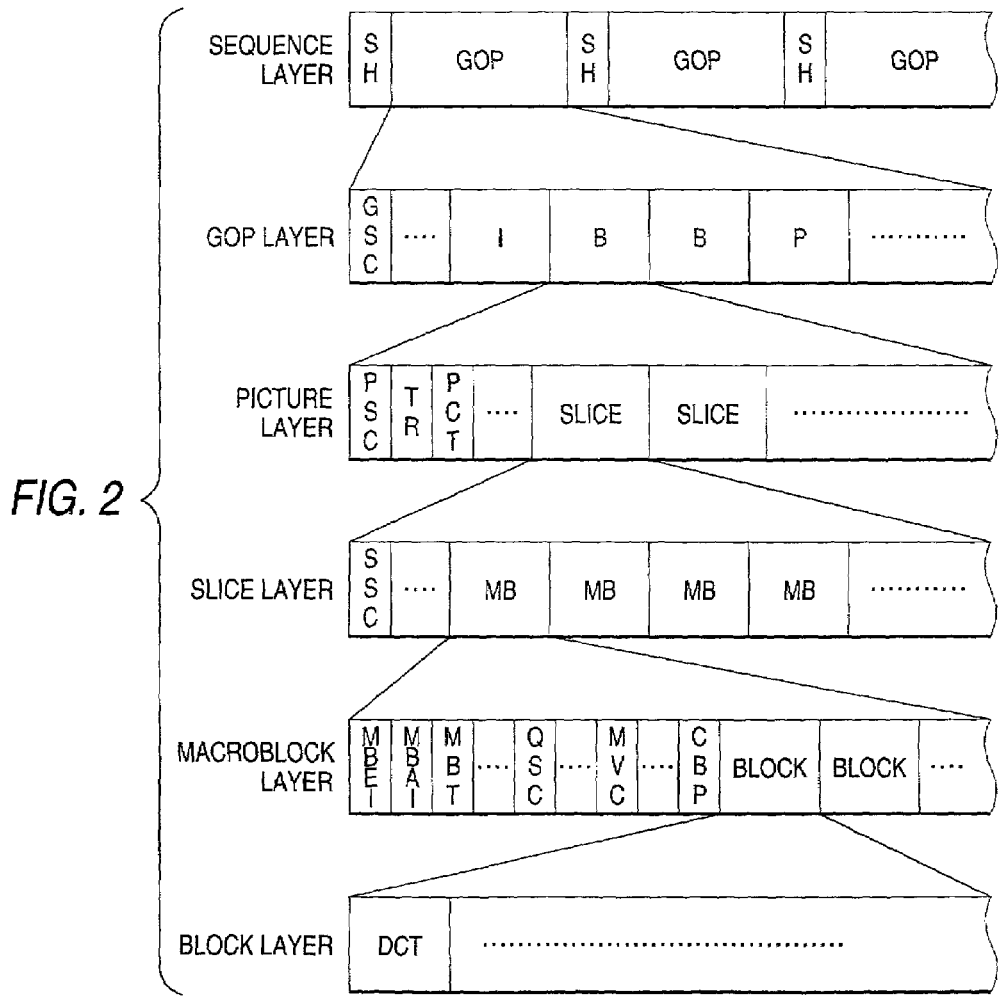

TRANSCODING METHOD AND TRANSCODING APPARATUS

BACKGROUND OF THE INVENTION

The present invention relates to techniques for coding moving picture data and transferring the coded data and, more particularly, to a transcoding method and apparatus for transforming coded data, which is generated by assuming a certain transmission rate, into coded data corresponding to a different transmission rate.

Generally, there have been proposed various kinds of dynamic image coding methods typified by MPEG2 (Moving Picture Experts Group 2) under ISO/IEC. Moreover, the transmission of coded data, which is obtained by employing these coding methods, to be performed by using various communication systems has come to be studied.

Meanwhile, coded data should be sometimes obtained through a plurality of networks that differ in transmission rate from one another. Such cases are, for example, a case where coded data is transmitted through both of a high-speed network (whose transmission rate: 10 to 100 Mbps), such as an intracompany LAN and an intranet, and a low-speed network, such as ISDN (Integrated Services Digital Network whose highest transmission rate: 128 kbps). In such a case, there is the necessity for causing a transcoding apparatus between the networks to convert coded data, which is obtained by assuming a transmission rate corresponding to the high-speed network, into coded data to be obtained by assuming a transmission rate corresponding to the low-speed network.

FIG. 10 is a block diagram schematically illustrating an example of the configuration of a related transcoding apparatus. It is assumed that the transcoding apparatus 50 receives first coded data obtained by performing a MPEG2 coding process (that is, variable length codes of quantized DCT (Discrete Cosine Transform) coefficients).

As illustrated in the figure, this transcoding apparatus 50 comprises a variable length decoder 51, an inverse quantizer 52, a quantizer 53, a variable length coder 54, and a quantizer scale controller 55. With such configuration, the transcoding apparatus 50 receives first coded data generated by assuming a transmission rate corresponding to the high-speed network and then converting this first coded data into second coded data corresponding to a transmission rate of the low-speed network.

That is, first, the first coded data received through the high-speed network is variable-length decoded by the first variable length decoder 51. Then, the decoded data is inverse-quantized by the inverse quantizer 52. Incidentally, a practical inverse quantization operation is performed by the inverse quantizer 52 as follows. The following equation is defined by ISO/IEC 13813-2, which is a standard for the generic coding of high-quality video signals, and is an arithmetic expression (incidentally, the following arithmetic expression is used for all coefficients except intra DC coefficients) for reproducing an inverse-quantized two dimensional coefficient matrix $F''[v][u]$ from a quantized two-dimensional coefficient matrix $QF[v][u]$ (incidentally, each of "v" and "u" is an integer ranging from 0 to 7).

$$F''[v][u] = (2 \times QF[v][u] + k) \times W[w][v][u] \times \text{Quantizer\_scale})/32 \quad \text{Equation 1}$$

where $$k = \begin{cases} 0 & \text{in tra blocks} \\ \text{Sign}(QF[v][u]) & \text{non -in tra blocks} \end{cases}$$

$$\text{Sign}(x) = \begin{cases} 1 & x > 0 \\ 0 & x = 0 \\ -1 & x < 0 \end{cases}$$

In the aforementioned equation, $W[w][v][u]$ is a weighted quantization matrix. "w" designates an integer, which ranges from 0 to 3 and indicates what matrix is selected from a plurality of kinds of matrices. "Quantizer_scale" denotes a factor that indicates a quantization rate of the inverse quantization and that is obtained by a table (that is, ISO/IEC 13818-2, Table 7-6) corresponding to the value of "Quantizer_scale_code". "Quantizer_scale_code" is a 5-bit unsigned integer ranging from 1 to 31. In a decoder, a current "Quantizer_scale_code" (that is, a current Quantizer scale code) is used until another "Quantizer_scale_code" appears in a slice or a macroblock. The transcoding apparatus 50 performs quantization by varying this "Quantizer_scale".

DCT coefficients obtained by the inverse quantization, in which the aforementioned operation is performed, are requantized by the quantizer 53, and then variable-length coded by a variable length coder 54. Subsequently, resultant codes are transmitted to the low-speed network as the second coded data. Incidentally, the quantizer 53 performs quantization on the data, outputted from the variable length decoder 51, by using the quantizer scale that is designated by the quantizer scale controller 55. This quantizer scale controller 55 is adapted to control the coarseness of the quantizer scale so that the second coded data transmitted from this transcoding apparatus 50 becomes coded data corresponding to the transmission rate of the low-speed network. Specifically, the quantizer scale controller 55 detects an amount of code stored in a buffer memory for storing, for example, the second coded data outputted from the variable length coder 54. Then, the quantizer scale controller 55 generates the quantizer scale, whose coarseness corresponds to this amount of code. That is, when the amount of code stored in the buffer memory is large, the quantizer scale controller 55 reduces the amount of code by generating the quantizer scale whose coarseness is large, whereas when the amount of code stored in the buffer memory is small, the portion 55 increases the amount of code by generating the quantizer scale whose coarseness is small (that is, the portion 55 suppresses the degradation in picture quality).

However, when the coarseness of the quantizer scale is designated depending only on the amount of code stored in the buffer memory, picture data representing a picture may be quantized at a coarse quantizer scale even though this picture plays an important part when a decoding operation is performed at the receiving side at which the second coded data is received. In such a case, the degradation not only in the picture quality of this picture but in that of an image to be restored according to this picture is caused. Thus, this related transcoding apparatus has a drawback in that the picture quality of a moving picture to be reproduced at the receiving side is extremely degraded. Thus, it is difficult for the related transcoding apparatus, which employs the aforementioned techniques, to efficiently perform quantization without degrading the picture quality of a moving picture.

In addition to the coding apparatus in which the coarseness of the quantization scale is designated depending on the amount of code stored in the buffer memory, there has been provided another transcoding apparatus adapted to perform the requantization by using a quantizer scale, which has a fixed value corresponding to a transmission rate needed at an output side. However, even in the case of this transcoding apparatus, it is difficult to efficiently perform the quantization without degrading the picture quality of a moving picture, similarly as in the case of the apparatus shown in FIG. 10.

SUMMARY OF THE INVENTION

The invention is accomplished in view of the aforementioned circumstances. Accordingly, an object of the invention is to provide a transcoding method and apparatus enabled to efficiently convert coded data without extremely degrading picture quality.

In order to solve the aforesaid object, the invention is characterized by having the following arrangement.

(1) A transcoding method of converting first coded data, which is obtained from a plurality of pictures of a moving-picture by performing a coding process including quantization, into second coded data, the transcoding method comprising the steps of:

performing inverse-quantization, corresponding to the quantization, on the first coded data respectively corresponding to macroblocks included in a plurality of slices of each of the plurality of pictures; and performing requantization on the inverse-quantized data respectively corresponding to the macroblocks by using a corresponding one of requantization scales corresponding to slices, to which the macroblocks respectively belong, to generate the second coded data.

(2) A transcoding method of converting first coded data, which is obtained from a plurality of pictures of a moving-picture by performing discrete cosine transform (DCT) and performing a coding process including quantization, into second coded data, the transcoding method comprising:

an inverse-quantization step of performing inverse-quantization, corresponding to the quantization, on the first coded data respectively corresponding to macroblocks of each of the plurality of pictures;

an obtaining step of obtaining DC-component difference values of DCT coefficients of each of the macroblocks of an intra-frame coded intra picture included in the first coded data; and a generating step of performing requantization on the inverse-quantized data respectively corresponding to the macroblocks by using a requantization scale corresponding to a corresponding one of the obtained DC-component difference values respectively corresponding to the macroblocks of the intra picture to generate the second coded data.

(3) The transcoding method according to (2), wherein one of the macroblocks belonging to a noticed region is detected according to the obtained DC-component difference values respectively corresponding to the macroblocks of the intra picture, and the second coded data is generated by using the requantization scale corresponding to the macroblock belonging to the noticed region, and the requantization scale which corresponds to each of the macroblocks belonging to the other regions and differs from the requantization scale corresponding to the macroblock belonging to the noticed region.

(4) A transcoding method of converting first coded data, which is obtained from a plurality of pictures of a moving-picture by performing discrete cosine transform (DCT) and performing a coding process including quantization, into second coded data, the transcoding method comprising the steps of:

performing inverse-quantization, corresponding to the quantization, on the first coded data respectively corresponding to macroblocks of each of the plurality of pictures;

obtaining DC-component difference values of DCT coefficients of each of the macroblocks of an intra-frame coded intra picture included in the first coded data; and performing requantization on the inverse-quantized data respectively corresponding to the macroblocks by using requantization scales according to slices, to which the macroblocks respectively belong, and according to the obtained DC-component difference values respectively corresponding to the macroblocks of the intra picture to generate the second coded data.

(5) A transcoding apparatus of converting first coded data, which is obtained from a plurality of pictures of a moving-picture by performing a coding process including quantization, into second coded data, the transcoding apparatus comprising:

an inverse-quantization unit which performs inverse-quantization, corresponding to the quantization, on the first coded data respectively corresponding to macroblocks included in a plurality of slices of each of the plurality of pictures; and a generating unit which performs requantization on the inverse-quantized data respectively corresponding to the macroblocks by using a corresponding one of requantization scales corresponding to slices, to which the macroblocks respectively belong, to generate the second coded data.

(6) A transcoding apparatus of converting first coded data, which is obtained from a plurality of pictures of a moving-picture by performing discrete cosine transform (DCT) and performing a coding process including quantization, into second coded data, the transcoding apparatus comprising:

an inverse-quantization unit which performs inverse-quantization, corresponding to the quantization, on the first coded data respectively corresponding to macroblocks of each of the plurality of pictures;

an obtaining unit which obtains DC-component difference values of DCT coefficients of each of the macroblocks of an intra-frame coded intra picture included in the first coded data; and a generating unit which performs requantization on the inverse-quantized data respectively corresponding to the macroblocks by using a requantization scale corresponding to a corresponding one of the obtained DC-component difference values respectively corresponding to the macroblocks of the intra picture to thereby generate the second coded data.

(7) A transcoding apparatus of converting first coded data, which is obtained from a plurality of pictures of a moving-picture by performing discrete cosine transform (DCT) and performing a coding process including quantization, into second coded data, the transcoding apparatus comprising:

an inverse-quantization unit which performs inverse-quantization, corresponding to the quantization, on first coded data respectively corresponding to macroblocks of each of the plurality of pictures;

an obtaining unit which obtains DC-component difference values of DCT coefficients of each of the macroblocks of an intra-frame coded intra picture included in the first coded data; and a generating unit which performs requantization on the inverse-quantized data respectively corresponding to the macroblocks by using requantization scales according to slices, to which the macroblocks respectively belong, and according to the obtained DC-component difference values respectively corresponding to the macroblocks of the intra picture to generate the second coded data.

(8) A transcoding method of converting first coded data, which is obtained from a plurality of pictures of a moving-picture by performing a coding process including quantization, into second coded data, the transcoding method comprising the steps of:

performing inverse-quantization, corresponding to the quantization, on the first coded data respectively corresponding to macroblocks included in a plurality of slices of each of the plurality of pictures;

determining a level of importance of each of the macroblocks;

determining a requantization scale based on the level of importance; and performing requantization on the inverse-quantized data by using the requantization scale to generate the second coded data.

(9) The transcoding method according to (8), wherein the step of determining the level of importance includes a step of detecting a noticed region in each of the plurality of pictures.

(10) The transcoding method according to (9), wherein the noticed region is specified by detecting an edge in each of the plurality of slices.

(11) The transcoding method according to (8), wherein the level of importance is determined according to a position of each of the plurality of slices.

(12) The transcoding method according to (9), wherein the level of importance is determined according to a combination of the detected result of the noticed region and a position of each of the plurality of slices.

BRIEF DESCRIPTION OF THE DRAWINGS

FIG. 1 is a block diagram illustrating the configuration of a communication system employing a transcoding apparatus according to an embodiment of the invention.

FIG. 2 is a diagram illustrating the data structure of coded data to be inputted to the transcoding apparatus.

DETAILED DESCRIPTION OF PREFERRED EMBODIMENTS

Figure 3:
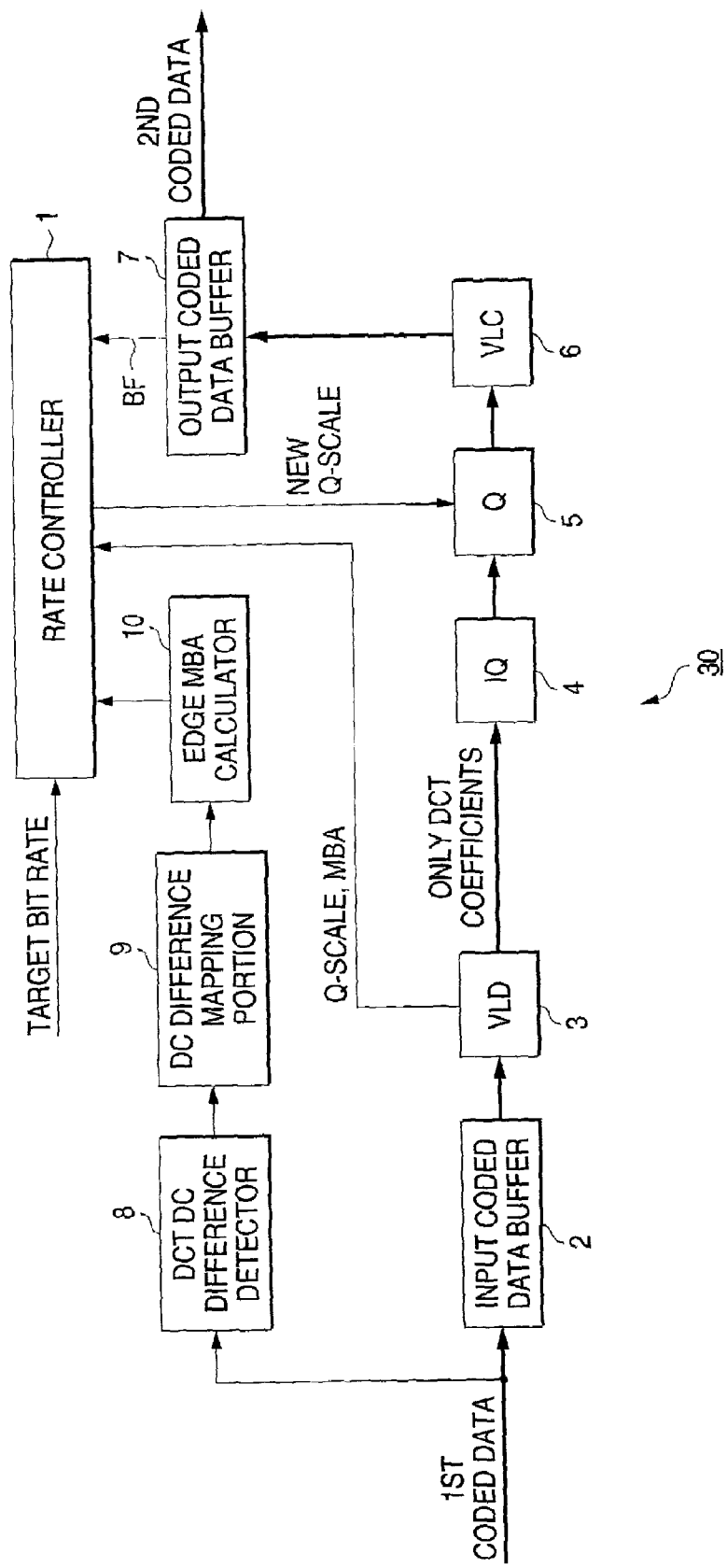
FIG. 3 is a block diagram illustrating the configuration of the transcoding apparatus.

Hereinafter, an embodiment of the invention is described with reference to the accompanying drawings. Such an embodiment is a mode for carrying out the invention. Thus, the invention is not limited thereto. Further, modifications thereof may be freely made within the scope of the invention.

A. Configuration of Embodiment

FIG. 1 is a block diagram schematically illustrating the configuration of a communication system employing a transcoding apparatus 30 according to this embodiment of the invention. As illustrated in this figure, this communication system comprises a transmitting side portion 11, a first network 12, a transcoding apparatus 30, a second network 22, and a receiving side portion 21. The transmitting side portion 11 is a server for providing, for example, moving picture data to a client, and encodes moving picture data, which is to be transmitted to the receiving side portion 21, according to an algorithm for coding with motion compensation. Then, the transmitting side portion 11 transmits the coded data, which is obtained in this way, to the first network 12. On the other hand, the receiving side portion 21 is a terminal unit, for instance, a personal computer, and receives the coded data transmitted from the transmitting side portion 11 through the second network 22. The receiving side portion 21 reproduces the moving picture by decoding this coded data. Incidentally, in the case illustrated in FIG. 1, it is assumed that the transmission rate of the second network 22 is lower than the transmission rate of the first network 12. The transcoding apparatus 30 illustrated in this figure intervenes between the first network 12 and the second network 22 and has a function for converting the coded data (hereunder referred to as "first coded data"), which is generated in the transmitting side portion 11 by assuming the transmission rate of the first network, into coded data (hereunder referred to as "second coded data") corresponding to the transmission rate of the second network 22.

In this embodiment, the first coded data to be inputted to the transcoding apparatus 30 from the first network 12 is data encoded by a coding algorithm in conformity to MPEG2 standards. Thus, the first coded data to be inputted to the transcoding apparatus 30 is described hereinbelow before the transcoding apparatus 30 is described in detail.

FIG. 2 illustrates the hierarchical structure of the first coded data to be inputted to the transcoding apparatus 30 and coded in conformity to the MPEG2 standards. As illustrated in this figure, the coded data has a structure consisting of 6 layers, that is, a sequence layer, a GOP layer, a picture layer, a slice layer, a macroblock layer, and a block layer.

The sequence layer consists of sets of a sequence header (SH) and a GOP (Group Of Pictures). A parameter included in the sequence header is, for instance, a bit rate value. A group start code (GSC) is provided at a leading portion of the GOP layer, and followed by a predetermined number of pictures (Pictures). Such pictures include an intra-frame encoded picture (I-picture: Intra Picture), a forward prediction encoding picture (P-picture: Predictive Picture), and a bidirectional prediction encoding picture (B-picture: Bidirectionally Predictive Picture). The GOP layer is constructed by arranging such I-, P-, and B-pictures in a predetermined order.

In the picture layer, several slices are arranged subsequent to a set of the picture start code (PSC: picture_start_code), a time reference code (Time Reference), and a picture coding type code (PCT: Picture Coding Type). Incidentally, the picture coding type code represents information on which of I-picture, P-picture, and B-picture the picture is. In the slice layer, several macroblocks (MB: Macroblock) are arranged subsequent to a slice start code (SSC). The MPEG2 standards inhibit one slice from extending over two rows or more. Therefore, one horizontal row of one or more macroblocks of a picture belongs to one slice.

In the macroblock layer, a macroblock address escape code (MBEI), a macroblock address increment code (MBAI), a macroblock type code (MBB), a quantizer scale code (QSC), a motion vector code (MVC: Motion Vertical Code), and a coded block pattern code (CBP) are arranged and followed by four luminance signal blocks and two color-difference signal blocks, which are obtained by employing 8×8 pixels as one block and dividing each macroblock into blocks.

Incidentally, the macroblock address increment code provides information indicating the position of a macroblock and is data obtained by variable-length coding information representing the difference between this macroblock and an immediately precedent macroblock. The macroblock address increment code is used for skipping a macroblock, which does not need such information, that is, a skipped macroblock which is not changed from the precedent frame in a B-picture and a P-picture. Further, the macroblock address increment code is data obtained by variable-length coding information representing {(the number of macroblocks to be skipped)+1}. On the other hand, in an I-picture, there are no macroblocks to be skipped. Thus, the macroblock address increment code is used for designating the position of each of the macroblocks at the I-picture.

The macroblock type code is data obtained by variable-length coding information representing a method of processing a macroblock in question in each of the I-picture, P-picture, and B-picture.

The quantizer scale code provides information designating the quantization step size for this corresponding macroblock. That is, the quantizer scale code designates the quantization step size used when data concerning this macroblock is quantized in the case of generating the first coding data. Therefore, when the data concerning this macroblock is inverse-quantized, the inverse quantization corresponding to the quantization step size represented by the quantizer scale code is performed with reference to this quantizer scale code.

The motion vector code corresponds to a relative motion from a macroblock in question to a reference macroblock of a reference frame. When an image of a certain macroblock is decoded, the location of the reference macroblock in the reference frame is obtained according to this motion vector code. The macroblock layer includes data obtained by variable-length coding such a motion vector.

The coded block pattern code provides patterned information indicating which of blocks of a macroblock is a significant block. That is, it is known from this code which of blocks is changed from the precedent screen.

In the block layer, data obtained by performing DCT (Discrete Cosine Transform), which is a kind of orthogonal transformation, on image data of a block and then quantizing resultant DCT coefficients and subsequently, variable-length coding the quantized DCT coefficients are arranged. Among 64 (=8×8) coefficient matrices F[u][v] obtained by performing DCT on each of the blocks, the leftwardly and upwardly placed coefficient F[0][0] is called DC (Direct Current) coefficient. The remaining 63 coefficients are called AC (Alternate Current) coefficients. In the B-picture and the P-picture, the DCT coefficients are obtained by performing DCT on a difference image between an image corresponding to a macroblock in question and another image corresponding to a reference macroblock in units of blocks. On the other hand, each of DC coefficients of four luminous blocks of the macroblock of the I-picture is encoded by using the difference data representing the difference (that is, the DC-component difference value) between this DC coefficient of the luminous block of this macroblock and the DC coefficient of the luminous block of the immediately precedent (or adjacent) macroblock in the order of the raster scan. Similarly, each of DC coefficients of two color difference blocks thereof is encoded by using the difference data representing the difference between this DC coefficient of the color difference block of this macroblock and the DC coefficient of the immediately precedent color difference block in the order of the raster scan. Incidentally, the coded value (or predicted value) at a leading one of the macroblocks of each of the slices is set at "128" when the bit length of the DC coefficient is 8. On the other hand, the AC coefficients of the macroblocks of the I-picture are variable-length coded after quantized by employing a value, which is obtained by multiplying the quantization matrix by the quantizer scale, as a step size. Further, after the DC coefficient and the AC coefficients of a non-intra macroblock are quantized by using the quantizer scale, the quantized levels there of are variable-length encoded in the order of the zigzag scan.

The first coded data of the aforementioned structure is inputted to the transcoding apparatus 30 shown in FIG. 1.

Next, the transcoding apparatus 30 according to the embodiment of the invention is described herein below by referring to FIG. 3. As illustrated in this figure, the transcoding apparatus 30 comprises an input coded data buffer 2, a variable-length decoder 3, an inverse quantizer 4, a quantizer 5, a variable length coder 6, a rate controller 1, an output coded data buffer 7, a DCT DC-difference detector 8, a DC difference mapping portion 9, and an edge MBA calculator 10. Incidentally, the transcoding apparatus 30 of the aforementioned configuration may be constituted as dedicated hardware. Alternatively, the transcoding apparatus 30 of the aforementioned configuration may be constituted by software.

The input coded data buffer 2 is a buffer for storing one slice (that is, the macroblock belonging to one horizontal line of the picture in the case of employing MPEG2 standards) of the first coded data to be inputted to this transcoding apparatus 30. When the next slice of the coded data is supplied thereto, the buffer 2 outputs the currently stored one slice of the coded data to the variable-length decoder 3. The first coded data supplied to the transcoding apparatus 30 is fed not only to the input coded data buffer 2 but to the DCT DC difference detector 8. The coded data to be inputted to the variable-length decoder 3 provided at a lower stage of the input coded data buffer 2 is delayed by a time corresponding to one slice behind the coded data outputted to the DCT DC difference detector 8 by interposing the input coded data buffer 2 there between. The coded data to be inputted to the variable-length decoder 3 is coded data, on which transcoding is performed, whereas the coded data to be inputted to the DCT DC difference detector 8 is used for obtaining a quantizer scale for requantization of the coded data to be performed by the rate controller 1 (to be described later). In this way, the coded data, on which the transcoding is performed, is delayed by a time corresponding to one slice, so that an operation of obtaining the quantizer scale for requantization is performed. This enables the apparatus 30 to perform transcoding in real time.

The variable-length decoder 3 performs variable-length decoding on the coded data supplied from the input coded data buffer 2 to thereby decode this data into the data that is in a state at the time before the variable-length coding is performed. The variable-length decoder 3 extracts quantizer scale (Q-scale) information, which represents a constant to be multiplied by the quantization step of the currently processed macroblock, and macroblock address (MBA) information, which designates the position of the currently processed macroblock in the picture, from the coded data supplied from the input coded data buffer 2. Then, the variable-length decoder 3 outputs the extracted information to the rate controller 1.

The inverse quantizer 4 inverse-quantizes data representing the DCT coefficients brought back by the variable-length decoder 3 to data that is in the state at the time before variable-length coded. Thus, the data is brought back to the state at the time before quantized. Therefore, the inverse quantization by the inverse quantizer 4 refers to the quantizer scale code corresponding to each of the macroblocks and then performs inverse-quantization according to the quantizer scale represented by the quantizer scale code.

The quantizer 5 performs requantization on the data, which is inverse-quantized by the inverse quantizer 4, by using information which is supplied from the rate controller 1 to each of the macroblocks to be processed and represents the quantizer scale. When the quantization is performed by the quantizer 5, other parameters, which do not under go quantization, are extracted from the coded data that is in the state at the time before converted.

The variable length coder 6 variable-length encodes data requantized by the quantizer 5, and then outputs the coded data which is variable-lengthen coded to the output coded data buffer. That is, the second coded data, the transcoding of which is finished, is outputted to the output coded data buffer 7.

The output coded data buffer 7 is a buffer for temporarily storing the second coded data, which is supplied from the variable-length coder 6 and finishes undergoing the transcoding, and for outputting the stored second coded data. Information BF representing the buffer amount of the output coded data buffer 7 is successively outputted to the rate controller 1. The rate controller 1 performs a buffer control operation by using the information BF indicating this buffer amount so that the amount of the outputted second coded data becomes suited to the transmission rate of the second network 22.

The DCT DC difference detector 8 extracts and outputs the DC-component difference value (that is, the direct current component difference value) of the DCT coefficient of each of the blocks of the macroblocks of the I-picture (that is, the intra-frame coded picture) included in the supplied first coded data. The DC difference mapping portion 9 performs the mapping of the DC-component difference values of the DCT coefficients extracted by the DCT DC difference detector 8 in units of slices. The edge MBA calculator 10 conjectures and detects edges of an image from the DC difference values of the DCT coefficient, the mapping of which is performed by the DC difference mapping portion 9 in units of slices. Then, the edge MBA calculator 10 obtains the macroblock address designating the conjectured positions of the edges and performs mapping of data representing the presence or absence of the edge of the macroblocks in units of slices.

Figure 4:
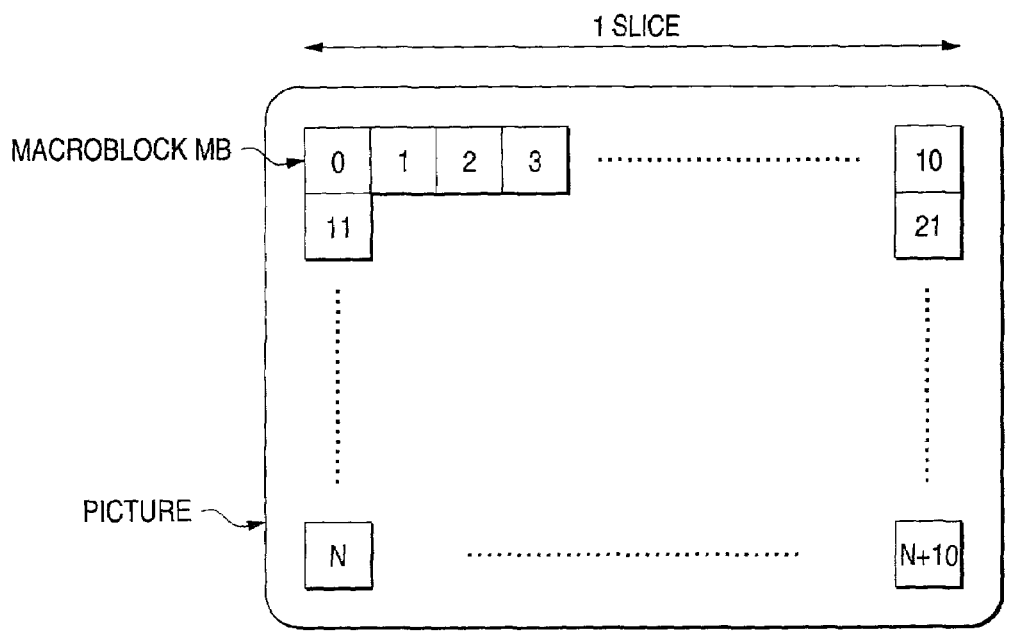
FIG. 4 is a diagram illustrating the concept of data included in a picture layer of the coded data.

Incidentally, the mapping of the DC-component difference value of the DCT coefficient, which is performed in the DC difference mapping portion 9 in units of slices, and the mapping of data representing the presence or absence of an edge, which is performed in the edge MBA calculator 10, in one slice in units of macroblocks are described herein below with reference to FIGS. 4 to 6. First, FIG. 4 is a diagram illustrating the structure of layers which are the picture layer and layers lower than the picture layer, and the arrangement of the macroblock. As illustrated in this figure, according to MPEG2 standards, one horizontal line of the picture is called "a slice". Each of slices comprises a plurality of (in the case of the embodiment of FIG. 1 is 11) macroblocks MB. That is, one horizontal line of macroblocks of the picture constitutes one slice.

Addresses are assigned to the macroblocks MB of each of the pictures in the order of the raster scan. When one picture comprises M of macroblocks, the address of the leftmost and top macroblock is 0. The address of the macroblock located at the right-hand side of the leftmost and top macroblock is 1. Thus, the address of the rightmost bottom macroblock is (M−1). Information designating the address of this macroblock is stored in the macroblock address increment code MBAI in the coded data. Therefore, the position of each of the macroblocks in the picture can be specified by referring to the macroblock address increment code MBAI. Each of the slices is a unit obtained by horizontally cutting through the picture so that the width thereof is equal to the height of a corresponding one of the macroblocks. Therefore, it can be judged by referring to the macroblock address increment code MBAI what part of the picture the slice corresponds to.

Figure 5:
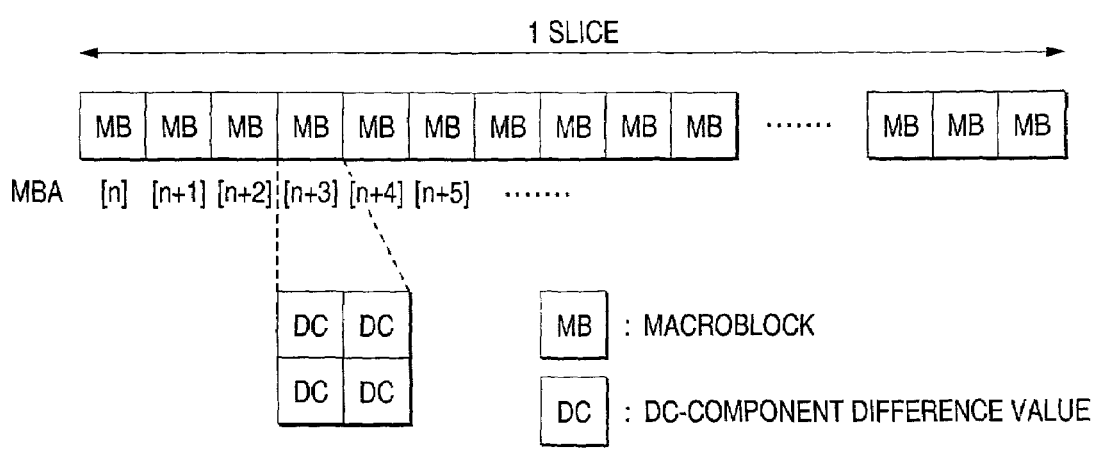
FIG. 5 is a diagram illustrating the mapping of DC-component difference values by a DC difference mapping portion of the transcoding apparatus.

Referring next to FIG. 5, this figure is a diagram for illustrating the mapping of the DC-component difference values of the DCT coefficients in the DC difference mapping portion 9 in units of slices in the I-picture. During this mapping operation, the DC-component difference values of the four luminous blocks of each of the macroblocks are arranged according to the order of placing the macroblocks in the slice of the I-picture in units of slices. Addresses n, n+1, n+2, n+3, n+4, n+5, . . . , ("n" is an integer that is equal to or more than 0) are respectively assigned to the macroblocks in the order of the raster scan as macroblock addresses. In the DC difference mapping portion 9, such a mapping operation is performed.

Figure 6:
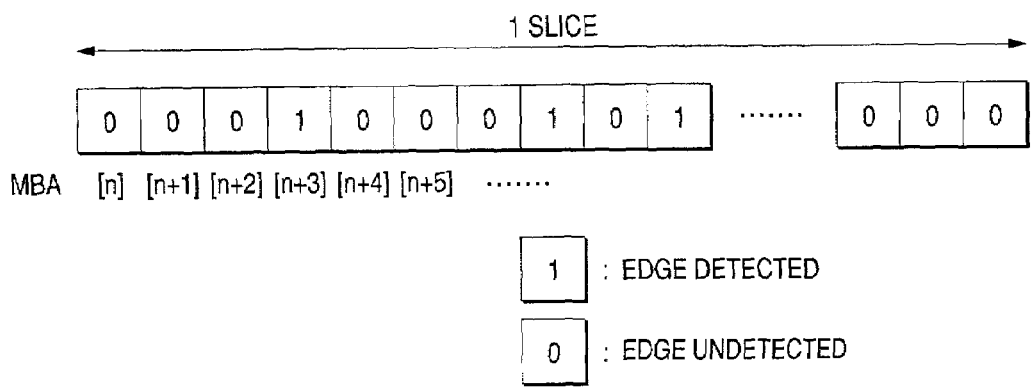
FIG. 6 is a diagram illustrating the mapping of results of detection of the presence of an edge, which is performed by an edge MBA calculator of the transcoding apparatus.

FIG. 6 is a diagram illustrating the mapping of data representing the presence or absence of an edge, which is performed in the edge MBA calculator 10, in one slice in units of macroblocks. In this mapping process, a predetermined operation is performed by using the DC-component difference value of each of the macroblocks of the I-picture, which are arranged in a map of FIG. 4, to thereby detect the presence or absence of an edge. Then, the calculator 10 performs an operation of storing "1" at a location corresponding to each of the macroblocks, each of which is detected as an edge part, and storing "0" at a location corresponding to each of the macroblocks, each of which is not detected as an edge part, according to results of the detection in units of slices. The predetermined operation is, for example, to compare there relative magnitudes of the values among the macroblocks of the slice, or to compare the absolute values with respect to a predetermined value thereamong and decides that the macroblock in question is an edge when the absolute value is judged as being relatively large, and that the macroblock in question is not an edge when the absolute value is judged otherwise. Similarly as in the case illustrated in FIG. 5, addresses n, n+1, n+2, n+3, n+4, n+5, . . . ("n" is an integer that is equal to or larger than 0) are assigned to the macroblocks in the order of the raster scan as the macroblock addresses. In the edge MBA calculator 10, such a mapping process is performed. Data representing results of the mapping process is outputted to the rate controller 1.

Returning to FIG. 3, the rate controller 1 obtains a quantizer scale, which is used for requantization to be performed by the quantizer 5, correspondingly to each of the macroblocks based on information BF representing a buffer amount, which is supplied from the output coded data buffer 7, information representing the transmission rate (that is, the transmission rate of the second network 22) to be set after the conversion of a target, information representing the quantizer scale of each of the macroblocks of the first coded data supplied from the variable-length decoder 3, and information designating the results of the mapping, which is supplied from the edge MBA calculator 10. Then, the rate controller 1 outputs information representing the obtained quantizer scale (that is, New Q-scale) to the quantizer 5.

Specifically, the rate controller 1 detects a noticed region, which a person easily notices in each of the slices according to the result (see FIG. 6) of the mapping supplied from the edge MBA calculator 10. The rate controller 1 outputs a quantizer scale, which is used for performing requantization of a quantizer scale so that the macroblocks of the noticed region are finely quantized, to the quantizer 5. Moreover, the rate controller 1 outputs a quantizer scale, according to which the macroblocks of regions other than the noticed region are coarsely quantized, to the quantizer 5. The rate controller 1 employs information of whether or not each of the macroblocks is a noticed region as a factor in determining the quantizer scale corresponding to each of the macroblocks, as described above. The rate controller 1 assigns weight to the quantizer scale according to the position of a slice to which each of the macroblocks belongs. That is, the rate controller 1 performs weighting so that fine quantization is performed on the macroblocks belonging to a slice, which a person easily notices, for example, a slice located at the central portion of the screen, and that conversely, coarse quantization is performed on peripheral portions (that is, upper and lower portions) of the screen, thereby to output a quantization scale, which is used for efficiently assigning bits, to the quantizer 5. The quantizer 5 performs requantization by using the quantizer scale outputted from the rate controller 1 in this way.

B. Operation of Embodiment

Next, a processing operation o the transcoding apparatus 30 having the aforementioned configuration is described hereinbelow. As described above, the rate controller 1 of the transcoding apparatus 30 employs information of whether or not the macroblock is a noticed region, and the position of a slice, to which this macroblock belongs, in the picture as two factors in determining the quantizer scale when a quantizer scale to be used for requantization of each of the macroblocks is determined. Herein after, for the purpose of clearly describing the method for determining the quantizer scale according to each of the factors, first, the techniques respectively used for determining the quantizer scales by employing the factors are described separately from one another. Thereafter, a processing operation of the transcoding apparatus 30 employing both the two factors is described.

First, an operation of the transcoding apparatus 30 provided by taking notice of the technique for determining the quantizer scale according to the noticed region is described hereinbelow. In the case of determining the quantizer scale according to this technique, the detection of whether or not the macroblock is a noticed region is performed by extracting a broad outline region of an I-picture from to the difference between the DC-components of the DCT coefficients of the I-picture. As described above, according to the MPEG standards, the DC-component of the DCT coefficient of an I-picture is encoded as the difference value between the DC-components of each block and the preceding block thereof. Therefore, when this difference value is large, there is a noticeable change in the DC-component between each block and the preceding block thereof. Therefore, the outline of an image can be detected by utilizing this change.

Figure 7:
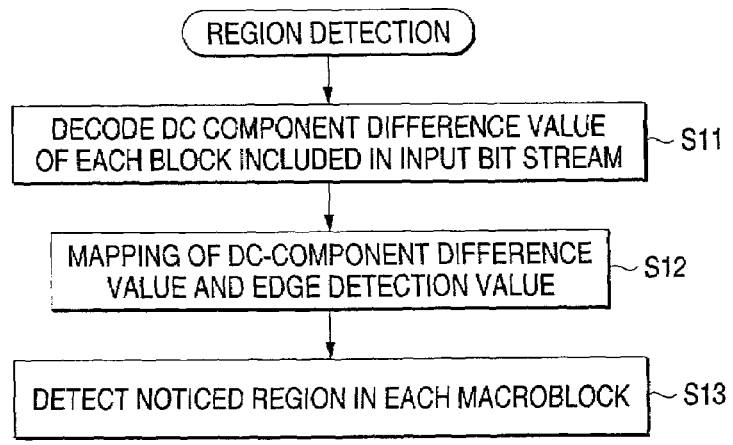
FIG. 7 is a flowchart illustrating an operation of the transcoding apparatus.
Figure 8:
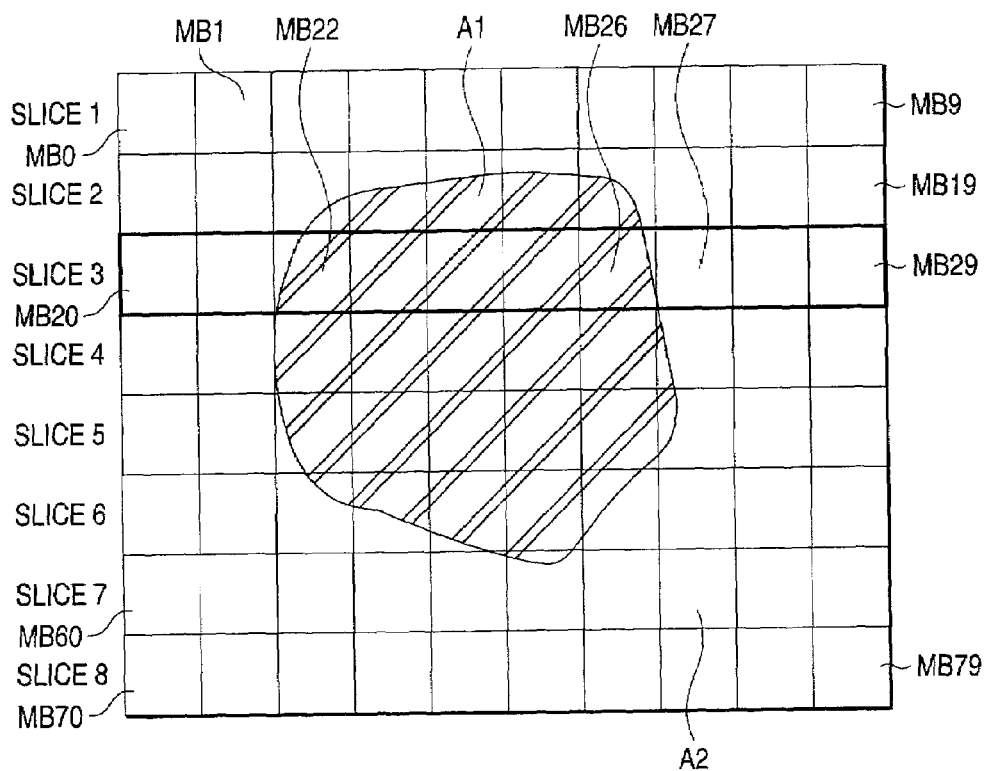
FIG. 8A is a diagram illustrating a picture for explaining an operation of the transcoding apparatus.
FIG. 8B is a diagram illustrating an example of the mapping of results of decision on the presence of an edge.

An operation to be performed in the case of inputting one picture of a bit stream as illustrated in FIGS. 8A and 8B is described hereinbelow by referring to a flowchart illustrated in FIG. 7. A picture illustrated in FIG. 8A is divided into 80 macroblocks MB0 to MB79. Each of slices Slice1 to Slice8 of one horizontal line of the picture consists of 10 macroblocks MB. This picture includes an object region A1 (that is, a region indicated by oblique lines in this figure) and a background region A2 (that is, another region other than the region indicated by oblique lines).

First, among the inputted first coded data, one slice of the data is stored in the input coded data buffer 2. The DCT DC difference detector 8 sequentially decodes the DC-component difference value of each of the blocks included in the first coded data (step S11). Subsequently, the DC difference mapping portion 9 performs the mapping of the DC-component difference values. The edge MBA calculator 10 detects the presence or absence of an edge. One slice of the result of the detection is subjected to mapping in units of macroblocks at step S12.

Incidentally, consider the case that the first coded data of the slice Slice3 is supplied to the DCT DC difference detector 8 in the example illustrated in FIG. 8A. First, the DC-component difference values of the blocks of each of the macroblocks MB20 to MB29 belonging to the slice Slice3 are serially obtained by the DCT DC difference value detector 8. Then, the DC difference mapping portion 9 performs a DC-component difference value mapping operation of arranging the DC-component difference values of the four luminous blocks of each of the macroblocks MB20 to MB29 according to the placing order of the macroblocks in the slice Slice3. The edge MBA calculator 10 detects the presence or absence of an edge by performing the predetermined operation on each of the macroblocks MB20 to MB29, which belong to the slice Slice3 and mapped in the aforementioned manner, by utilizing the DC-component difference values. When an edge is detected in the macroblocks as the result of the detection, a value of "1" is stored at a corresponding memory location. When the edge is not detected, value of "0" is stored at a corresponding memory location. In the slice Slice3, the macroblocks MB20, MB21, and MB27 to MB29 belong to the background region A2. The macroblocks MB22 to MB26 belong to the object region A1. Therefore, considering that the DC-component difference value of a macroblock is determined according to a change in the image data between this macroblock and an adjacent macroblock, the DC-component difference values of the macroblocks MB22 and MB27 should be large, as compared with those of the other macroblocks. Thus, among the macroblocks MB20 to MB29 of the slice Slice3, the macroblocks MB22 and MB27 can be detected as edges. As illustrated in FIG. 8B, the value "1" is mapped to the corresponding memory areas (that is, the memory areas corresponding to a macroblock address (MBA)=22 and a macroblock address (MBA)=27), while the value "0" is mapped to the other memory areas.

When the mapping (see FIG. 8B) is performed on each of the slices by the edge MBA calculator 10 according to whether or not each of the macroblocks thereof is an edge, the rate controller 1 detects a noticed region in units of macroblocks at step S13 by referring to the result of this mapping. The detection of the region is performed by judging, when the number of detected edges is 0 or 1, that there is no noticed regions, and by judging, when two or more edges are detected, that there is a noticed region.

When it is detected that there is a noticed region, the noticed region is specified in the picture according to predetermined conditions. For instance, when it is detected that the macroblocks MB22 and MB27 are edges as in the aforementioned example, the macroblocks from MB22, at which a first one of the edges is detected, to MB26, which is just precedent to the macroblock MB27 detected as a second one of the edges, are specified as noticed regions in this slice in the order of the raster scan. Incidentally, when three or more edges are detected in a slice, it is sufficient that macroblocks from the macroblock, at which a first one of the edges is detected, to the macroblock, at which the last one of the edges is detected, are specified as noticed regions.

The macroblock addresses (MBA) of the macroblocks included in the specified noticed-regions are set as corresponding to the noticed regions. The macroblock addresses (MBA) of the macroblocks outside the specified noticed-regions are set as not corresponding to the noticed regions. When no noticed regions are detected, the macroblock addresses (MBA) of all the macroblocks in this slice are set as not corresponding to the noticed regions. The result of setting the macroblocks according to such a technique as being the noticed regions or as not being the noticed region is used as the factor in determining the quantizer scale.

Next, an operation of the transcoding apparatus 30 provided by taking notice of the technique for determining the quantizer scale according to the position of the slice, to which the macroblocks belong, in the picture is described hereinbelow. It is assumed that the transcoding apparatus employs the technique for finely requantising a slice located at the central portion of the picture and for coarsely quantising a slice located at the remaining portions (that is, upper and lower portions) of the picture by utilizing the fact that generally, an image of the central portion is easily noticed by a viewer, by way of example. The operation of the transcoding apparatus is described in the case of using, for example, the picture illustrated in FIG. 8A. Supposing that half of eight slices, for instance, the slices Slice3 to Slice6 are those of the central portion, and that the remaining slices Slice1, Slice2, Slice7, and Slice8 are those of the part to there than the central portion, the macroblocks MB20 to MB59 of the slices belonging to the central portion are set as being finely quantized, while the macroblocks MB0 to MB19 of the slices belonging to the part other than the central portion are set as being coarsely quantized. The result of setting the macroblocks according to the position of the slice, to which the macroblocks belong, according to such a technique is employed as a factor in determining the quantizer scale.

Figure 9:
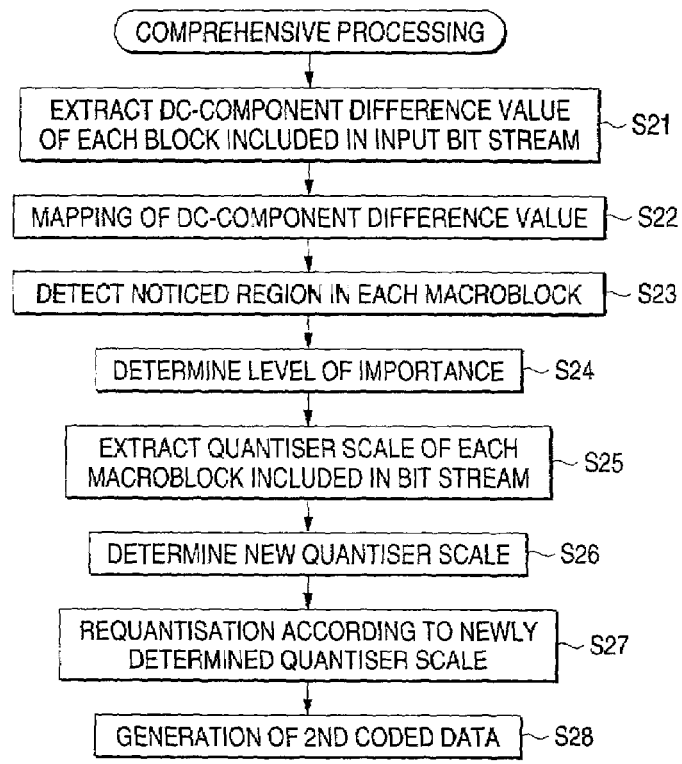
FIG. 9 is a flowchart illustrating an operation of the transcoding apparatus.
Figure 10:
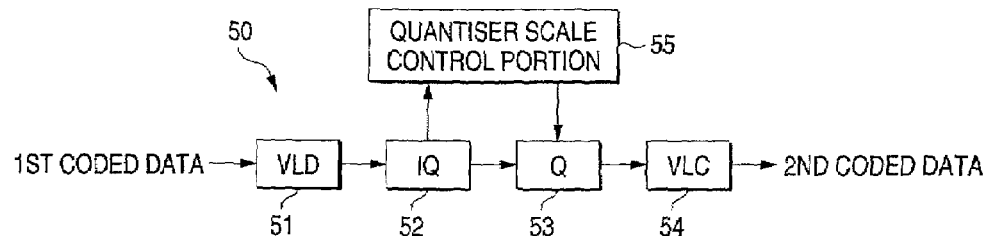
FIG. 10 is a block diagram illustrating the configuration of a related transcoding apparatus.

Next, a processing operation of the transcoding apparatus 30 finally determining the quantizer scale is described hereinbelow with reference to a flowchart of FIG. 9. The quantizer scale is determined by comprehensively judging according to the combination of the technique for determining the quantizer scale according to the noticed regions and the technique for determining the quantizer scale according to the position of the slice, to which the macroblocks belong,. First, similarly as at steps S11 to S13 of FIG. 7, the extraction of DC-component difference value of each of blocks included in the first coded data at step S21, the mapping of the DC-component difference values at step S22, and the detection of noticed regions in units of macroblocks at step S23 are performed.

Subsequently, the rate controller 1 determines a level of importance of each of the macroblocks according to the result of the detection of the noticed region in units of macroblocks (incidentally, the higher the importance of a macroblock is, the more finely the quantization is performed thereon) at step S24. The level of importance of the macroblock is determined by the aforementioned setting performed according to whether or not the macroblock is the noticed region, and to the position of the slice. That is, when a certain macroblock belongs to a slice of a portion other than the central portion and is not a noticed region, low importance is given to this macroblock. When a certain macroblock belongs to a slice of the central portion and is a noticed region, high importance is given to this macroblock. When a certain macroblock belongs to a slice of the central portion and is not a noticed region, medium importance is given to this macroblock. Fundamentally, as described above, the factors, that is, the position of the slice, to which the macroblock belongs, and whether or not the macroblock is inside the noticed region are used for determining the quantizer scale. However, other conditions may be added thereto, if necessary. The other conditions are, for example, results of judgment made in the immediately precedent slice, and whether the macroblock in question is located at the central portion or at the other portions (that is, at the left or right end).

The first coded data is variable length decoded by the variable decoder 3, and the extraction of the quantizer scale of each of the macroblocks is performed at step S25. The rate controller 1 determines a new quantizer scale according to the original quantizer scale included in the first coded data and to the aforementioned level of importance and outputs the new quantizer scale to the quantizer 5 at step S26. Then, the quantizer 5 performs requantization according to the newly determined quantizer scale at step S27. Subsequently, the data, on which the requantization is performed by the quantizer 5, is variable-length encoded by the variable-length coder 6 to thereby generate second coded data and output the second coded data through the output coded data buffer 7 at step S28.

As described above, according to this embodiment, regions, which seem to be noticed by a person, and regions, which seem to be not noticed by a person, are detected by utilizing the difference values of the DC-components of the DCT coefficients of the macroblocks of the I-picture, which can easily be extracted from the first coded data already encoded without performing special operations. Thus, the quantizer scales to be used for requantization can be determined so that the noticed regions are finely quantized and that non-noticed regions are coarsely quantized. Therefore, operations to be performed at the time of requantization can be efficiently achieved without extremely degrading the picture quality of an image of a region, which a person easily notices. Although it is not impossible that similar operations are performed at the encoder side, instead of the transcoding apparatus 30, which employs coded bit streams as input signals and is disclosed in the present application, it is considerably complex and impractical to perform such analysis simultaneously with encoding, and to enable the encoding to reflect a result of the analysis. However, according to the configuration of this embodiment, the scale of the circuit is not large even when the invention is implemented by an integrated circuit. Further, even when the invention is implemented by software, the scale of computing is not large. Thus, this embodiment is practicable.

C. Examples of Modification

Incidentally, the mode for carrying out the Invention is not limited to the aforementioned embodiment, which may be suitably modified.

First Modification

Although it has been described in the foregoing description of the aforementioned embodiment of the invention by way of example that the transcoding of the data encoded is performed by conducting a coding operation in conformity with MPEG2 standards, the invention is not limited thereto. The invention may be applied to data encoded by performing a coding operation in conformity with other standards, such as MPEG1 standards.

Second Modification

Further, for instance, results of judgment made in a slice directly precedent to a currently processed slice or in a plurality of already processed slices of the same picture may be employed in the aforementioned embodiment as conditions for detecting noticed regions. In this case, even in the case that only one edge is detected in the slice in question, one of regions provided at the left-hand side and the right-hand side of a region, at which the edge is detected, may be determined according to the result of the past judgment as a noticed region. When three or more edges are detected, it is enabled to select a plurality of noticed regions in the slice.

Third Modification

Incidentally, the transcoding apparatus 30 of the invention may be constituted by combining a computer with programs to be executed therein. The programs may be distributed through a computer-readable recording media or communication circuits.

As described above, according to the invention, coded data can be efficiently converted without extremely degrading picture quality.

What is claimed is:

1. A transcoding method of converting first coded data, which is obtained from a plurality of pictures of a moving-picture by performing discrete cosine transform (DCT) and performing a coding process including quantization, into second coded data, the transcoding method comprising:
   an inverse-quantization step of performing inverse-quantization, corresponding to the quantization, on the first coded data respectively corresponding to macroblocks of each of the plurality of pictures;
   an obtaining step of obtaining DC-component difference values of DCT coefficients of each of the macroblocks of an intra-frame coded intra picture included in the first coded data; and
   a generating step of performing requantization on the inverse-quantized data respectively corresponding to the macroblocks by using a requantization scale corresponding to a corresponding one of the obtained DC-component difference values respectively corresponding to the macroblocks of the intra picture to generate the second coded data.

2. The transcoding method according to claim 1, wherein one of the macroblocks belonging to a noticed region is detected according to the obtained DC-component difference values respectively corresponding to the macroblocks of the intra picture, and
   the second coded data is generated by using the requantization scale corresponding to the macroblock belonging to the noticed region, and the requantization scale which corresponds to each of the macroblocks belonging to the other regions and differs from the requantization scale corresponding to the macroblock belonging to the noticed region.

3. The transcoding method according to claim 2, wherein if a slice of the picture includes at least two edges, it is determined that said slice includes the noticed region, and if the slice of the picture includes less than two edges, it is determined that said slice does not include the noticed region. (See page 33).

4. The transcoding method according to claim 2, wherein the requantizer scale of the noticed region is weighted to be fine as compared with that of a non-notice region. (See page 28).

5. A transcoding method of converting first coded data, which is obtained from a plurality of pictures of a moving-picture by performing discrete cosine transform (DCT) and performing a coding process including quantization, into second coded data, the transcoding method comprising the steps of:
   performing inverse-quantization, corresponding to the quantization, on the first coded data respectively corresponding to macroblocks of each of the plurality of pictures;
   obtaining DC-component difference values of DCT coefficients of each of the macroblocks of an intra-frame coded intra picture included in the first coded data; and
   performing requantization on the inverse-quantized data respectively corresponding to the macroblocks by using requantization scales according to slices, to which the macroblocks respectively belong, and according to the obtained DC-component difference values respectively corresponding to the macroblocks of the intra picture to generate the second coded data.

6. A transcoding apparatus of converting first coded data, which is obtained from a plurality of pictures of a moving-picture by performing discrete cosine transform (DCT) and performing a coding process including quantization, into second coded data, the transcoding apparatus comprising:
   an inverse-quantization unit which performs inverse-quantization, corresponding to the quantization, on the first coded data respectively corresponding to macroblocks of each of the plurality of pictures;
   an obtaining unit which obtains DC-component difference values of DCT coefficients of each of the macroblocks of an intra-frame coded intra picture included in the first coded data; and
   a generating unit which performs requantization on the inverse-quantized data respectively corresponding to the macroblocks by using a requantization scale corresponding to a corresponding one of the obtained DC-component difference values respectively corresponding to the macroblocks of the intra picture to thereby generate the second coded data.

7. A transcoding apparatus of converting first coded data, which is obtained from a plurality of pictures of a moving-picture by performing discrete cosine transform (DCT) and performing a coding process including quantization, into second coded data, the transcoding apparatus comprising:
   an inverse-quantization unit which performs inverse-quantization, corresponding to the quantization, on first coded data respectively corresponding to macroblocks of each of the plurality of pictures;

an obtaining unit which obtains DC-component difference values of DCT coefficients of each of the macroblocks of an intra-frame coded intra picture included in the first coded data; and a generating unit which performs requantization on the inverse-quantized data respectively corresponding to the macroblocks by using requantization scales according to slices, to which the macroblocks respectively belong, and according to the obtained DC-component difference values respectively corresponding to the macroblocks of the intra picture to generate the second coded data.

8. A transcoding method of converting first coded data, which is obtained from a plurality of pictures of a moving-picture by performing a coding process including quantization, into second coded data, the transcoding method comprising the steps of:

performing inverse-quantization, corresponding to the quantization, on the first coded data respectively corresponding to macroblocks included in a plurality of slices of each of the plurality of pictures;

determining a level of importance of each of the macroblocks;

determining a requantization scale based on the level of importance; and performing requantization on the inverse-quantized data by using the requantization scale to generate the second coded data.

9. The transcoding method according to claim 8, wherein the step of determining the level of importance includes a step of detecting a noticed region in each of the plurality of pictures.

10. The transcoding method according to claim 9, wherein the noticed region is specified by detecting an edge in each of the plurality of slices.

11. The transcoding method according to claim 9, wherein the level of importance is determined according to a combination of the detected result of the noticed region and a position of each of the plurality of slices.

12. The transcoding method according to claim 10, wherein the edge is detected based on a difference value between the DC-components. (See page 30).

13. The transcoding method according to claim 8, wherein the level of importance is determined according to a position of each of the plurality of slices.

* * * * *